US010392448B2

(12) United States Patent
Salit

(10) Patent No.: US 10,392,448 B2
(45) Date of Patent: Aug. 27, 2019

(54) METHOD FOR GRAFTING A CARBOXYLIC ACID ESTER FUNCTION ONTO AN UNSATURATED POLYMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Anne-Frédérique Salit, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 195 days.

(21) Appl. No.: 15/310,418

(22) PCT Filed: May 19, 2015

(86) PCT No.: PCT/EP2015/060927
§ 371 (c)(1),
(2) Date: Nov. 10, 2016

(87) PCT Pub. No.: WO2015/177105
PCT Pub. Date: Nov. 26, 2015

(65) Prior Publication Data
US 2017/0073434 A1 Mar. 16, 2017

(30) Foreign Application Priority Data
May 23, 2014 (FR) .................... 14 54660

(51) Int. Cl.
C08C 19/22 (2006.01)
C08L 15/00 (2006.01)
C08K 5/00 (2006.01)
C08K 3/013 (2018.01)

(52) U.S. Cl.
CPC ............. *C08C 19/22* (2013.01); *C08K 3/013* (2018.01); *C08K 5/0008* (2013.01); *C08L 15/00* (2013.01)

(58) Field of Classification Search
CPC .... C08K 3/013; C08K 5/0008; C08K 3/0033; C08L 15/00; C08C 19/22
USPC ...................................................... 524/572
See application file for complete search history.

(56) References Cited

U.S. PATENT DOCUMENTS

| 7,300,970 | B2 | 11/2007 | Durel et al. |
| 7,491,767 | B2 | 2/2009 | Durel et al. |
| 7,649,042 | B2 | 1/2010 | Robert et al. |
| 9,132,699 | B2 | 9/2015 | Lopitaux et al. |
| 9,434,823 | B2 | 9/2016 | Matmour et al. |
| 2005/0004267 | A1 | 1/2005 | Robert et al. |
| 2005/0016650 | A1 | 1/2005 | Durel et al. |
| 2005/0016651 | A1 | 1/2005 | Durel et al. |
| 2006/0084730 | A1* | 4/2006 | Fukushima .......... C07D 263/14 524/90 |
| 2012/0065292 | A1 | 3/2012 | Lopitaux et al. |
| 2014/0228510 | A1 | 8/2014 | Matmour et al. |
| 2017/0081506 | A1* | 3/2017 | Kato ..................... B60C 1/00 |

FOREIGN PATENT DOCUMENTS

| EP | 1451246 A1 | 9/2004 |
| FR | 2943065 A1 | 9/2010 |
| FR | 2981354 A1 | 4/2013 |
| WO | 03002648 A1 | 1/2003 |
| WO | 03002649 A1 | 1/2003 |

OTHER PUBLICATIONS

Koyama et al., "Cascade functionalization of unsaturated bond-containing polymers using ambident agents possessing both nitrile N-oxide and electrophilic functions," Chem. Commun., 48, pp. 10304-10306. (Year: 2012).*
Yabukov, A. P.; Tsyganov, D.V.; Belen'kii, L.I.; Krayushkin, M.M ; Bulletin of the Academy of Sciences of the USSR, Division of Chemical Science (English Translation); vol. 40; No. 7.2; (1991); p. 1427-1432; Izvestiya Akademii Nauk SSSR, Seriya Khimicheskaya; nb. 7 (1991); p. 1609-1615.
International Search Report dated Aug. 11, 2015.

* cited by examiner

*Primary Examiner* — Josephine L Chang
(74) *Attorney, Agent, or Firm* — Dickinson Wright PLLC

(57) ABSTRACT

A method for grafting a carboxylic acid ester function onto an unsaturated polymer, which comprises the reaction of a 1,3-dipolar compound with at least one unsaturation of the unsaturated polymer is provided. The 1,3-dipolar compound comprises a group Q and a group B connected to one another by a group A in which:
 Q comprises a dipole containing at least and preferably one nitrogen atom,
 B represents a carboxylic acid ester function,
 A, which is preferably divalent, is an atom or a group of atoms connecting Q to B.

16 Claims, No Drawings

METHOD FOR GRAFTING A CARBOXYLIC ACID ESTER FUNCTION ONTO AN UNSATURATED POLYMER

This application is a 371 national phase entry of PCT/EP2015/060927, filed 19 May 2015, which claims benefit of French Patent Application No. 1454660, filed 23 May 2014, the entire contents of which are incorporated herein by reference for all purposes.

BACKGROUND

1. Technical Field

The present invention relates to a method for synthesizing a polymer comprising an unsaturated carbon-based chain and carboxylic acid ester functions along the polymer chain.

2. Related Art

Polymers having both an unsaturated carbon-based chain and carboxylic acid ester functions along the polymer chain may be synthesized by radical copolymerization of 1,3-diene and methacrylate. Reference may be made to the patent EP 1 451 246 B1 which describes such a method. This synthesis method is very widely known. The success of this method is due in part to the market availability of numerous methacrylate monomers. Nonetheless, it is still worthwhile to have alternative synthesis methods to those already known, to give the possibility of using the method which proves to be the most suitable in the specific case.

SUMMARY

The applicants have discovered a novel method for synthesizing a polymer having an unsaturated carbon-based chain and carboxylic acid ester functions along the polymer chain. This discovery was made possible by virtue of developing a novel compound.

Thus, a first subject of the invention is a method for synthesizing an unsaturated polymer comprising at least one carboxylic acid ester function along the polymer chain, which method comprises the reaction of a 1,3-dipolar compound with at least one unsaturation of the unsaturated polymer, which 1,3-dipolar compound comprises a group Q and a group B connected to one another by a group A in which:

Q comprises a dipole containing at least and preferably one nitrogen atom,
B represents a carboxylic acid ester function,
A, which is preferably divalent, is an atom or a group of atoms connecting Q to B.

The invention also relates to a polymer which is capable of being obtained by the method in accordance with the invention.

Another subject of the invention is a composition which comprises a filler and a polymer in accordance with the invention.

DETAILED DESCRIPTION OF EXAMPLE EMBODIMENTS

In the present description, unless expressly indicated otherwise, all the percentages (%) shown are % by weight. The abbreviation "phr" means parts by weight per hundred parts of elastomer (of the total of the elastomers, if several elastomers are present).

Furthermore, any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

"Unsaturated polymer" is intended to mean a polymer having an unsaturated carbon-based chain.

The essential feature of the 1,3-dipolar compound is that it comprises a group Q and a group B connected to one another by a group A in which:

Q comprises a dipole containing at least and preferably one nitrogen atom,
B represents a carboxylic acid ester function,
A, which is preferably divalent, is an atom or a group of atoms connecting Q to B.

The term "1,3-dipolar compound" is understood according to the definition given by the IUPAC.

According to one embodiment, the group B corresponds to the formula (I)

$$—C(OR)=O \quad (I)$$

in which R is a carbon-based group which may contain at least one heteroatom.

The carbon-based group which may contain a heteroatom preferably contains from 1 to 20 carbon atoms, more preferentially from 1 to 12 carbon atoms and more preferentially still from 1 to 6 carbon atoms. According to any one embodiment, those carbon-based groups having from 1 to 3 carbon atoms, such as the methyl group or the ethyl group, are suitable as carbon-based group R.

A may be a group containing up to 20 carbon atoms, which group may contain at least one heteroatom. A may be an aliphatic or aromatic group.

When A is an aliphatic group, A preferentially contains from 1 to 20 carbon atoms, more preferentially from 1 to 12 carbon atoms, more preferentially still from 1 to 6 carbon atoms and very particularly from 1 to 3 carbon atoms. When A is an aromatic group, A preferentially contains from 6 to 20 carbon atoms and more preferentially from 6 to 12 carbon atoms.

Particularly suitable as divalent group A is an alkylene group containing from 1 to 20 carbon atoms, preferentially from 1 to 12 carbon atoms, more preferentially from 1 to 6 carbon atoms and more preferentially still from 1 to 3 carbon atoms. Mention may be made, as suitable divalent group A containing from 1 to 3 carbon atoms, of the methylene group.

An arylene group preferably containing from 6 to 20 carbon atoms, more preferentially from 6 to 12 carbon atoms, may also be suitable as divalent group A.

Very particularly suitable as 1,3-dipolar compounds are the compounds selected from the group consisting of nitrile oxides, nitrile imines and nitrones, in which case Q contains a —C"Nfi O, —C"Nfi N— or —C=N(fi O)— unit.

According to a specific embodiment in which Q comprises a —C"Nfi O unit, Q preferentially comprises the unit corresponding to the formula (II) in which four of the five symbols $R_1$ to $R_5$, which are identical or different, are each an atom or a group of atoms and the fifth symbol denotes a direct or indirect attachment to A, it being known that $R_1$ and $R_5$ are both other than H. The four of the five symbols $R_1$ to $R_5$ may be aliphatic or aromatic groups. The aliphatic groups may contain from 1 to 20 carbon atoms, preferentially from 1 to 12 carbon atoms, more preferentially from 1 to 6 carbon atoms and more preferentially still from 1 to 3 carbon atoms. The aromatic groups may contain from 6 to 20 carbon atoms and preferentially from 6 to 12 carbon atoms.

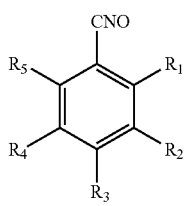
(II)

$R_1$, $R_3$ and $R_5$ are preferentially each an alkyl group of 1 to 6 carbon atoms, more preferentially of 1 to 3 carbon atoms, and more preferentially still a methyl or ethyl group.

According to a variant of this specific embodiment, $R_1$, $R_3$ and $R_5$ are identical. According to this variant in which they are identical, $R_1$, $R_3$ and $R_5$ are preferentially each an alkyl group of 1 to 6 carbon atoms, more preferentially of 1 to 3 carbon atoms, and more preferentially still a methyl or ethyl group.

In the case in which the fifth symbol denotes an indirect attachment to A, the fifth symbol preferably represents a heteroatom, preferably oxygen.

More preferentially, the 1,3-dipolar compound is 3-(2-ethoxy-2-oxoethoxy)-2,4,6-trimethylbenzonitrile oxide corresponding to the formula (11a)

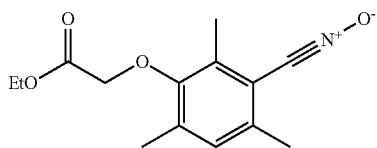
(IIa)

According to the specific embodiment in which Q comprises a —C=N(fi O)— unit, Q preferentially comprises the unit corresponding to the formula (III) or (IV)

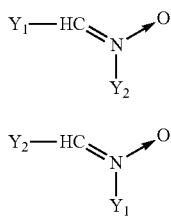
(III)

(IV)

in which:
$Y_1$ is an aliphatic group, preferentially an alkyl group preferably containing from 1 to 12 carbon atoms, or an aromatic group containing from 6 to 20 carbon atoms, preferentially an alkylaryl group, more preferentially a phenyl or tolyl group, and $Y_2$ is an aliphatic group, preferentially a saturated hydrocarbon-based group preferably containing from 1 to 12 carbon atoms, and comprising a direct attachment to A, or an aromatic group preferentially containing from 6 to 20 carbon atoms and comprising, on the benzene ring thereof, a direct attachment to A.

The method in accordance comprises the reaction of the 1,3-dipolar compound described above with at least one unsaturation of an unsaturated polymer.

According to any one embodiment, the 1,3-dipolar compound preferably reacts with several unsaturations of the unsaturated polymer, in which case the method enables the synthesis of an unsaturated polymer comprising several carboxylic acid ester functions along the polymer chain. Several unsaturations is intended to mean at least two unsaturations.

The reaction of the 1,3-dipolar compound with the polymer is an addition reaction, specifically here a [3+2] cycloaddition.

According to one preferential embodiment, the unsaturations of the polymer are carbon-carbon bonds, preferably carbon-carbon double bonds.

The reaction of the 1,3-dipolar compound with the polymer may be carried out in bulk, for example in an internal mixer or an external mixer, such as an open mill. The mixture comprising the 1,3-dipolar compound and the polymer is for example brought to a temperature of the external mixer or internal mixer of less than 60° C., then placed under a press or in an oven at temperatures ranging from 80° C. to 200° C. Alternatively, the mixture is brought to a temperature of the external mixer or internal mixer of greater than 60° C., without subsequent heat treatment.

The addition reaction of the 1,3-dipolar compound with the polymer may also be carried out in solution. The temperature at which the reaction is carried out is easily adjusted by those skilled in the art from their general knowledge by taking into account the concentration of the reaction medium, the reflux temperature of the solvent, and the thermal stability of the polymer and the 1,3-dipolar compound. For example, a temperature in the vicinity of 60° C. may be suitable. The polymer thus modified may be separated from its solution by any type of means known to those skilled in the art and in particular by an operation of evaporating the solvent under reduced pressure or by a steam stripping operation.

In the addition reaction of the 1,3-dipolar compound with the polymer, the 1,3-dipolar compound is reacted according to a preferential stoichiometry of between 0 and 5 molar equivalents, more preferentially between 0 and 2 molar equivalents, even more preferentially still between 0 and 1 molar equivalent, of carboxylic acid ester functions per 100 moles of monomer units constituting the polymer. For each of these preferential ranges, the lower limit is advantageously at least 0.1 molar equivalent of 1,3-dipolar compound. The amount of 1,3-dipolar compound used is expressed in molar equivalents of carboxylic acid ester functions. For example, if the 1,3-dipolar compound contains a single carboxylic acid ester function, one mole of carboxylic acid ester function corresponds to one mole of 1,3-dipolar compound. If the 1,3-dipolar compound contains two carboxylic acid ester functions, two moles of carboxylic acid ester functions correspond to one mole of 1,3-dipolar compound. In the latter case, the use of the 1,3-dipolar compound according to one molar equivalent of carboxylic acid ester function corresponds to a half-mole of 1,3-dipolar compound.

Preferentially, whether the reaction of the 1,3-dipolar compound with the polymer is carried out in solution or in bulk, the polymer is antioxidized beforehand in order to prevent possible degradation of the macrostructure of the polymer during the reaction.

Before undergoing the addition reaction with the 1,3-dipolar compound, the unsaturated polymer has at least one and preferably several unsaturations which are capable of reacting with the 1,3-dipolar compound.

The unsaturated polymer is preferably a diene polymer, more preferably a diene elastomer.

"Diene polymer" should be understood as meaning a polymer comprising diene monomer units, in particular 1,3-diene monomer units.

A "diene" elastomer (or without distinction rubber) should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". Generally, "essentially unsaturated" is intended to mean a diene elastomer resulting at least in part from conjugated diene monomers having a content of units of diene origin (conjugated dienes) which is greater than 15% (mol %); thus, diene elastomers such as butyl rubbers or copolymers of dienes and α-olefins of EPDM type do not fall within the preceding definition and can especially be described as "essentially saturated" diene elastomers (low or very low content, always less than 15%, of units of diene origin). In the category of "essentially unsaturated" diene elastomers, a "highly unsaturated" diene elastomer is intended in particular to mean a diene elastomer having a content of units of diene origin (conjugated dienes) which is greater than 50%.

Given these definitions, "diene elastomer capable of being used in the compositions" is intended more particularly to mean:

(a) any homopolymer of a conjugated diene monomer, especially any homopolymer obtained by polymerization of a conjugated diene monomer having from 4 to 12 carbon atoms;

(b) any copolymer obtained by copolymerization of one or more conjugated dienes with one another or with one or more vinylaromatic compounds having from 8 to 20 carbon atoms;

(c) a ternary copolymer obtained by copolymerization of ethylene and an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as especially 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer.

Although any type of diene elastomer applies, those skilled in the art of tires will understand that the essentially unsaturated diene elastomers, in particular of the above type (a) or (b), are preferred.

In the case of copolymers of the type (b), the latter contain from 20% to 99% by weight of diene units and from 1% to 80% by weight of vinylaromatic units.

The following are especially suitable as conjugated dienes: 1,3-butadiene, 2-methyl-1,3-butadiene, alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

Preferentially, the diene elastomer is an essentially unsaturated elastomer selected from the group consisting of polybutadienes (BRs), polyisoprenes, butadiene copolymers, isoprene copolymers and the mixtures of these elastomers. The following are very particularly suitable as diene elastomer: a polybutadiene (BR), a copolymer of butadiene and styrene (SBR), a natural rubber (NR) or a synthetic polyisoprene (IR) preferentially with a molar content of cis-1,4-bonds of greater than 90%.

Another subject-matter of the invention is the polymer which may be obtained by the method described according to any one of its embodiments.

The polymer may be used in a polymer composition which may contain, in addition to the polymer, a filler which is preferably a reinforcing filler. The following may be mentioned as reinforcing filler: carbon black, a mineral reinforcing filler such as silica, with which a coupling agent is combined in a known manner, or else a mixture of these two types of filler, such as a reinforcing silica or a carbon black. The coupling agent (or bonding agent), especially a silane, is at least bifunctional intended to provide a satisfactory chemical and/or physical connection between the inorganic filler (surface of its particles) and the polymer. Use is made in particular of at least bifunctional organosilanes or polyorganosiloxanes. Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650). Particularly suitable, without the definition below being limiting, are silane polysulphides corresponding to the general formula (V):

$$Z\text{-}A\text{-}S_x\text{-}A\text{-}Z \qquad (V)$$

in which:

x is an integer from 2 to 8 (preferably from 2 to 5);

the A symbols, which are identical or different, represent a divalent hydrocarbon-based radical (preferably a $C_1$-$C_{18}$ alkylene group or a $C_6$-$C_{12}$ arylene group, more particularly a $C_1$-$C_{10}$, especially $C_1$-$C_4$, alkylene, in particular propylene);

the Z symbols, which are identical or different, correspond to one of the three formulae below:

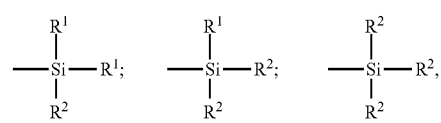

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, especially $C_1$-$C_4$ alkyl groups, more particularly methyl and/or ethyl);

the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferentially still a group selected from $C_1$-$C_4$ alkoxyls, in particular methoxyl and ethoxyl).

The composition may also comprise all or a portion of the usual additives customarily used in polymer compositions, such as, for example, plasticizers or extending oils, pigments, protective agents, such as antiozone waxes, chemical antiozonants, antioxidants, antifatigue agents or a crosslinking system.

The abovementioned characteristics, and also others, will be better understood on reading the following description of several exemplary embodiments, given by way of non-limiting illustration.

EXAMPLE EMBODIMENTS

1-Measurements and Tests Used:
NMR Analysis:
The structural analysis and also the determination of the molar purities of the molecules synthesized are carried out by an NMR analysis. The spectra are acquired on a Bruker Avance 3400 MHz spectrometer equipped with a 5 mm BBFO Z-grad "broad band" probe. The quantitative $^1$H NMR experiment uses a simple 30° pulse sequence and a repetition time of 3 seconds between each of the 64 acquisitions. The samples are dissolved in deuterated dimethyl sulphoxide (DMSO). This solvent is also used for the lock signal. Calibration is carried out on the signal of the protons of the deuterated DMSO at 2.44 ppm and on the carbons of the deuterated DMSO at 39.5 ppm with respect to a TMS reference at 0 ppm. The $^1$H NMR spectrum coupled with the 2D $^1$H/$^{13}$C HSQC and $^1$H/$^{13}$C HMBC experiments make possible the structural determination of the molecules (cf. tables of assignments). The molar quantifications are carried out from the quantitative 1D $^1$H NMR spectrum.

2 Synthesis of the 1,3-dipolar compound 3-(2-ethoxy-2-oxoethoxy)-2,4,6-trimethylbenzonitrile oxide This compound may be prepared according to the following reaction scheme:

The preparation of the compound 3-hydroxy-2,4,6-trimethylbenzaldehyde is described in the paper by Yabukov, A. P.; Tsyganov, D. V.; Belen'kii, L. I.; Krayushkin, M. M; *Bulletin of the Academy of Sciences of the USSR, Division of Chemical Science* (English Translation); vol. 40; no. 7.2; (1991); p. 1427-1432; Izvestiya Akademii Nauk SSSR, Seriya Khimicheskaya; nb. 7 (1991); p 1609-1615.

2-1-Synthesis of ethyl-2(3-formyl-2,4,6-trimethylphenoxy)acetate

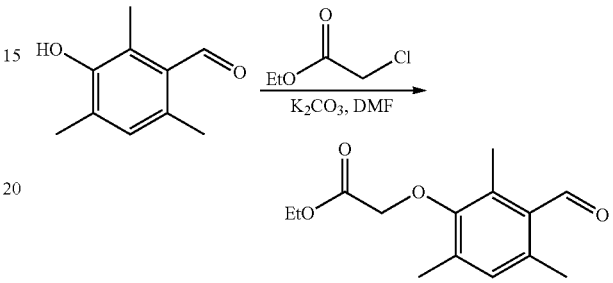

A mixture of 3-hydroxy-2,4,6-trimethylbenzaldehyde (30.00 g, 0.183 mol) and $K_2CO_3$ (18.94 g, 0.137 mol) in DMF (110 ml) is stirred at room temperature for 10-15 minutes. Ethyl chloroacetate (22.4 g, 0.183 mol) in DMF (15 ml) is added to this mixture. The temperature of the mixture is brought to 74° C. for 4 hours. After bringing back to room temperature, the mixture is diluted with water (800 ml) and $CH_2Cl_2$ (150 ml). The aqueous phase is extracted with $CH_2Cl_2$ (3 times with 50 ml). The organic phases are combined, then washed with a solution of NaOH (5.0 g, 0.125 mol) in water (100 ml), washed with water (4 times with 100 ml) and concentrated under reduced pressure down to 21 mbar (36° C.). A white solid (42.96 g, yield 94%) with a melting point of 55° C. is obtained. The molar purity is greater than 98% $^1$H NMR).

NMR Analysis:

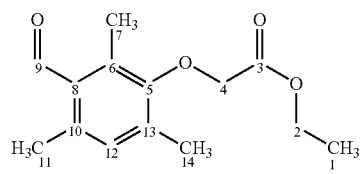

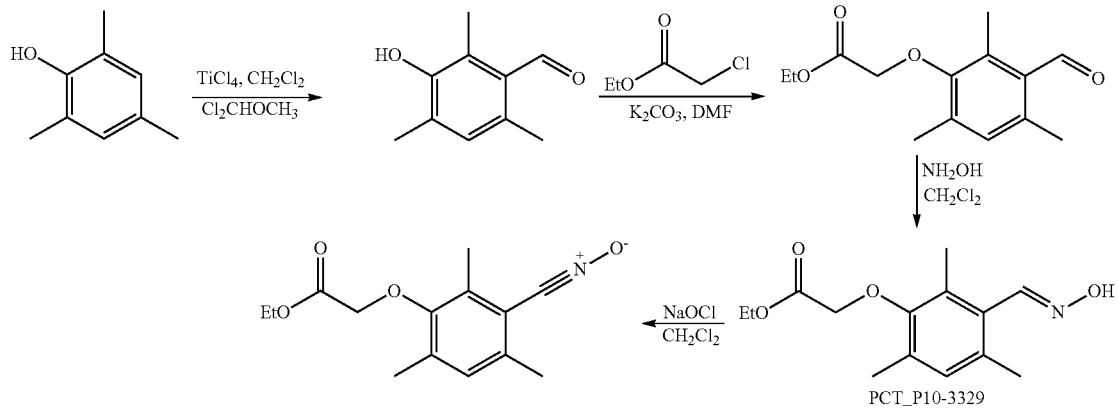

PCT_P10-3329

Solvent: DMSO

| No. | δ ₁H (ppm) | δ ₁₃C (ppm) |
|---|---|---|
| 1 | 1.18 | 14.4 |
| 2 | 4.13 | 60.9 |
| 3 | / | 168.8 |
| 4 | 4.37 | 49.5 |
| 5 | / | 153.9 |
| 6/10/13 | / | Between 130 and 140 |
| 7 | 2.39 | 12.4 |
| 8 | / | 131.7 |
| 9 | 10.36 | 194.1 |
| 11 | 2.39 | 19.7 |
| 12 | 6.94 | 132.1 |
| 14 | 2.20 | 16.7 |

2-2-Synthesis of ethyl-2-(3-((hydroxyimino)methyl)-2,4,6-trimethylphenoxy)acetate

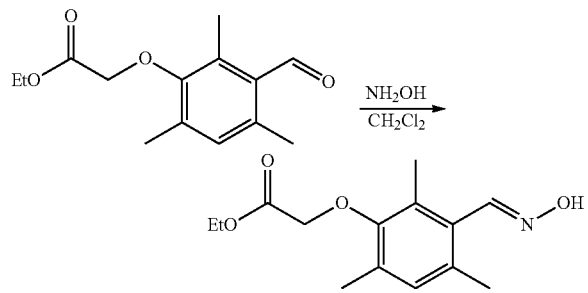

An aqueous hydroxylamine solution (13.5 g, 0.204 mol, 50% in water, Aldrich) in EtOH (25 ml) is added to a solution of ethyl-2-(3-formyl-2,4,6-trimethylphenoxy)acetate (42.5 g, 0.170 mol) in EtOH (250 ml) at 40° C. The reaction medium is then stirred at a temperature of between 45° C. and 50° C. After 4 hours at this temperature, water (50 ml) is added to the reaction medium. The reaction medium is evaporated under reduced pressure (T$_{bath}$ 37° C., 80 mbar), until a suspension is obtained. The precipitate obtained is filtered and washed on the filter by EtOH/water (15 ml/45 ml), then by EtOH/petroleum ether (15 ml/45 ml) and finally by petroleum ether (2×30 ml). The product obtained is dried under atmospheric pressure at room temperature. A white solid (31.83 g, yield 73%) with a melting point of 89° C. is obtained. The molar purity is greater than 99% (¹H NMR).

NMR Analysis:

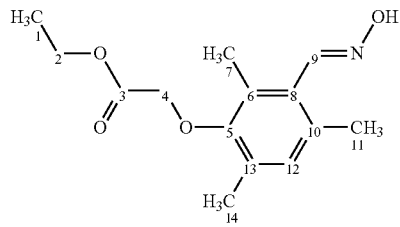

Solvent: DMSO

| No. | δ ₁H (ppm) | δ ₁₃C (ppm) |
|---|---|---|
| 1 | 1.17 | 13.8 |
| 2 | 4.13 | 60.2 |
| 3 | / | 168.5 |
| 4 | 4.34 | 68.8 |
| 5 | / | 152.9 |
| 6/8/10/13 | / | Between 129.2 and 132.2 |
| 7 | 2.17 | 13.2 |
| 9 | 8.19 | 147.3 |
| 11 | 2.18 | 20.1 |
| 12 | 6.86 | 130.3 |
| 14 | 2.14 | 15.6 |

2-3-Synthesis of 3-(2-ethoxy-2-oxoethoxy)-2,4,6-trimethylbenzonitrile oxide

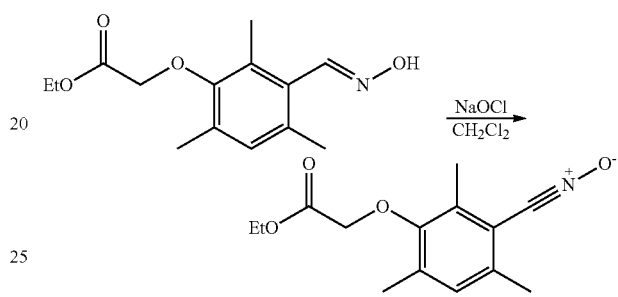

A solution of ethyl-2-(3-((hydroxyimino)methyl)-2,4,6-trimethylphenoxy)acetate (20.0 g, 0.075 mol) in CH₂Cl₂ (450 ml) is cooled to −4° C. Once at this temperature, bleach (4% active chlorine, Aldrich) (92 ml) is added dropwise over 5 minutes. The temperature of the reaction medium during the addition is maintained between −4° C. and −1° C. The reaction medium is then stirred for 35 minutes between 0 and 5° C. then stirred until it returns to ambient temperature (3.0-3.5 hours). The aqueous phase is separated and washed with CH₂Cl₂ (3 times with 20 ml). The combined organic phases are washed with water (3 times with 75 ml) and concentrated under reduced pressure (T$_{bath}$ 25° C.) down to 50 ml (97 g). The solution obtained is diluted with petroleum ether (120 ml, 40/60° C. fractions) and concentrated under reduced pressure (T$_{bath}$ 25° C.) until a precipitate forms. After 4-5 hours at −18° C. the precipitate is filtered off and washed on the filter with a CH₂Cl₂/petroleum ether (5 ml/20 ml) mixture and then with petroleum ether (2 times 25 ml, 40/60° C. fractions), and finally dried under atmospheric pressure at room temperature for 12 hours. A white solid (13.67 g, 0.052 mol, yield 69%) with a melting point of 102° C. is obtained. The molar purity is greater than 99% (¹H NMR).

NMR Analysis:

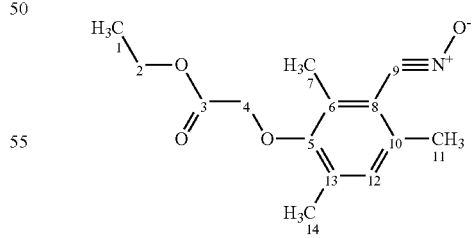

Solvent: DMSO

| No. | δ ₁H (ppm) | δ ₁₃C (ppm) |
|---|---|---|
| 1 | 1.17 | 13.7 |
| 2 | 4.13 | 60.3 |
| 3 | / | 168.3 |

-continued

| No. | δ$_1$H (ppm) | δ$_{13}$C (ppm) |
|---|---|---|
| 4 | 4.41 | 68.8 |
| 5 | / | 152.8 |
| 6/10 | / | 133.8/137.1 |
| 7 | 2.27 | 14.3 |
| 8 | / | 111.8 |
| 9 | / | / |
| 11 | 2.27 | 19.5 |
| 12 | 7.01 | 130.0 |
| 13 | / | 134.3 |
| 14 | 2.18 | 16.0 |

3-Addition of the 1,3-dipolar compound 3-(2-ethoxy-2-oxoethoxy)-2,4,6-trimethylbenzonitrile oxide onto a polymer Use is made of the 1,3-dipolar compound obtained according to the procedure described above.

The polymer is an SBR which contains 26% of styrene units and 24% of 1.2 units of the butadiene part.

The ethyl-2-(3-(nitrileoxide)methyl)-2,4,6-trimethylphenoxy)acetate (0.79 g, 3.01 mmol), of 99 mol % NMR purity, is incorporated into 20 g of SBR on an open mill (external mixer at 30° C.). The mixture is homogenized in 15 turnover passes. This mixing phase is followed by a heat treatment at 120° C. for 10 minutes under a press at a pressure of 10 bar. Analysis by $^1$H NMR made it possible to determine a molar degree of addition of the 1,3-dipolar compound of 0.91 mol % and a molar addition yield of 91%.

The invention claimed is:

1. A composition which comprises a filler and a polymer obtained by synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function, and
A is an atom or a group of atoms connecting Q to B.

2. A composition according to claim 1, in which the unsaturated polymer is a diene polymer selected from the group consisting of polybutadienes, polyisoprenes, butadiene copolymers, isoprene copolymers and the mixtures of these elastomers.

3. A composition according to claim 1, in which B corresponds to the formula (I)

—C(OR)=O  (I)

in which R is a carbon-based group.

4. A composition according to claim 3, in which the carbon-based group contains from 1 to 20 carbon atoms.

5. A composition according to claim 1, in which A is a group containing up to 20 carbon atoms.

6. A composition according to claim 5, in which A is aliphatic or aromatic.

7. A composition according to claim 1, in which Q comprises the unit corresponding to the formula (II):

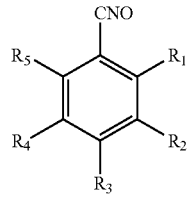

(II)

in which:
four of the five symbols $R_1$ to $R_5$, which are identical or different, are each an atom or a group of atoms, and $R_4$ denotes a direct or indirect attachment to A, wherein $R_1$ and $R_5$ are both other than H.

8. A composition according to claim 7, in which $R_4$ denotes an indirect attachment to A.

9. A composition according to claim 8, in which $R_4$ represents a heteroatom.

10. A method for synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function,
A is an atom or a group of atoms connecting Q to B, and
the 1,3-dipolar compound is reacted according to a stoichiometry of between 0 and 5 molar equivalents of ester functions per 100 moles of monomer units constituting the polymer.

11. A method for synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function,
A is a group containing up to 20 carbon atoms connecting Q to B, and A is an alkylene group.

12. A method for synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function,
A is an atom or a group of atoms connecting Q to B, Q comprises the unit corresponding to the formula (II):

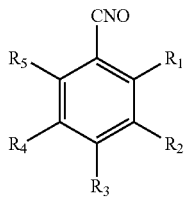

(II)

in which:
four of the five symbols $R_1$ to $R_5$, which are identical or different, are each an atom or a group of atoms, and $R_4$ denotes a direct or indirect attachment to A, wherein $R_1$ and $R_5$ are both other than H, and $R_1$, $R_3$ and $R_5$ are identical.

13. A method for synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function,
A is an atom or a group of atoms connecting Q to B,
Q comprises the unit corresponding to the formula (II):

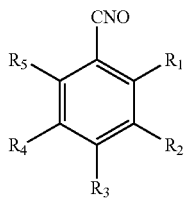

(II)

in which:
four of the five symbols $R_1$ to $R_5$, which are identical or different, are each an atom or a group of atoms, and $R_4$ denotes a direct or indirect attachment to A, wherein $R_1$ and $R_5$ are both other than H, and $R_1$, $R_3$ and $R_5$ are each an alkyl group of 1 to 6 carbon atoms.

14. A method according to claim 13, in which $R_1$, $R_3$ and $R_5$ are each a methyl or ethyl.

15. A method for synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function,
A is an atom or a group of atoms connecting Q to B,
Q comprises the unit corresponding to the formula (II):

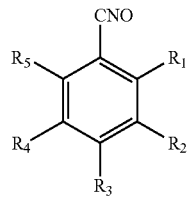

(II)

in which:
four of the five symbols $R_1$ to $R_5$, which are identical or different, are each an atom or a group of atoms, and $R_4$ denotes a direct or indirect attachment to A, wherein $R_1$ and $R_5$ are both other than H, $R_4$ represents a heteroatom, and the 1,3-dipolar compound is of formula (IIa)

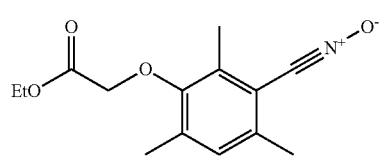

(IIa)

16. A method for synthesizing an unsaturated polymer comprising at least one carboxylic acid ester function along the polymer chain, which comprises reacting a 1,3-dipolar compound with at least one unsaturation of an unsaturated polymer, which 1,3-dipolar compound comprises a group Q and a group B connected to one another by a group A in which:
Q comprises a dipole containing at least one nitrogen atom,
B represents a carboxylic acid ester function,
A is an atom or a group of atoms connecting Q to B, and
Q comprises the unit corresponding to the formula (III) or (IV):

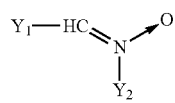

(III)

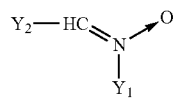

(IV)

in which:
$Y_1$ is an aliphatic group or an aromatic group containing from 6 to 20 carbon atoms, and $Y_2$ is an aliphatic group, comprising a direct attachment to A, or an aromatic group comprising, on the benzene ring thereof, a direct attachment to A.

* * * * *